United States Patent [19]
Relange

[11] Patent Number: 4,957,033
[45] Date of Patent: Sep. 18, 1990

[54] DEVICE FOR SEALING THE MOBILE ELEMENTS OF AN ARTILLERY RECOIL BRAKE

[76] Inventor: Dominique Relange, 30, rue Henri Boyer, F-18000 Bourges, France

[21] Appl. No.: 371,558

[22] Filed: Jun. 23, 1989

[30] Foreign Application Priority Data

Jun. 30, 1988 [FR] France ............ 88 08804

[51] Int. Cl.$^5$ ............ F41A 25/02
[52] U.S. Cl. ............ 89/43.01; 188/312; 188/313
[58] Field of Search ............ 89/43.01, 198; 188/312, 188/313, 322.17

[56] References Cited

U.S. PATENT DOCUMENTS

| | | | |
|---|---|---|---|
| 378,333 | 2/1888 | Noble | 89/43.01 |
| 456,016 | 7/1891 | Canet | 89/43.01 |
| 1,072,350 | 9/1913 | Muller | 89/43.01 |
| 1,074,541 | 9/1913 | Dawson et al. | 89/43.01 |
| 2,370,363 | 2/1945 | Lippert | 89/43.01 |
| 4,038,905 | 8/1977 | DuPont, Jr. et al. | 89/43.01 |
| 4,360,085 | 11/1982 | Pendergast | 188/315 |

FOREIGN PATENT DOCUMENTS

| | | | |
|---|---|---|---|
| 2715826 | 10/1977 | European Pat. Off. . | |
| 2905298 | 8/1980 | European Pat. Off. . | |
| 802259 | 2/1951 | Fed. Rep. of Germany | 188/313 |
| 1177420 | 9/1964 | Fed. Rep. of Germany | 188/313 |
| 557584 | 8/1923 | France | 188/313 |
| 660414 | 7/1929 | France | 188/313 |
| 879222 | 2/1943 | France . | |
| 1077677 | 11/1954 | France | 188/313 |
| 1198818 | 12/1959 | France . | |
| 1522274 | 4/1968 | France . | |
| 12783 | 9/1903 | Norway | 89/43.01 |
| 171426 | 5/1960 | Sweden | 89/43.01 |
| 73206 | 9/1916 | Switzerland | 89/43.01 |
| 4131 | of 1907 | United Kingdom | 89/43.01 |
| 19765 | of 1912 | United Kingdom | 89/43.01 |
| 441531 | 1/1936 | United Kingdom | 188/313 |
| 666663 | 2/1952 | United Kingdom | 188/313 |

*Primary Examiner*—Charles T. Jordan
*Assistant Examiner*—Stephen Johnson

[57] ABSTRACT

The technical field of the present invention is that of sealing devices between a piston rod and a cylinder of an artillery recoil brake. The piston divides the chamber into a high-pressure chamber and a low-pressure chamber. The volumes of the chambers vary according to the position of the piston relative to the cylinder. The sealing device according to the invention includes a "medium-pressure" chamber through which the piston rod passes, and which communicates with the high pressure chamber by means of a roughly annular channel surrounding the piston rod. The medium-pressure chamber is connected to the low pressure chamber by a pipe having a cross sectional area greater than that of the annular channel. The device is intended for applications to artillery material.

9 Claims, 3 Drawing Sheets

DEVICE FOR SEALING THE MOBILE ELEMENTS OF AN ARTILLERY RECOIL BRAKE

BACKGROUND OF THE INVENTION

1. Field of the Invention

The present invention relates to sealing devices for the mobile elements of artillery recoil brakes.

2. Description of the Prior Art

It is known that an artillery gun includes:

a recoiling mass consisting essentially of the tube-breech assembly;

a recoil brake placed between the recoiling mass and the gun mount, and which usually operates hydraulically;

a filling device to remedy any fluid leakage that may appear in the brake, and to keep the assembly under constant pressure, generally on the order of a few bars, when at rest;

a counterrecoil device that stores a part of the recoil energy and returns it later to the mobile assembly to return it to battery position, ready for a new shot.

Several principles of hydraulic recoil brake operation are known. The most commonly used are:

brakes with liner sleeves (FIG. 1);

brakes with counteracting rods (FIG. 2).

In both cases, these brakes consist of a piston 1 sliding inside a cylinder 2, which is filled with a fluid (most often oil). The piston therefore defines one annular chamber 4 and one cylindrical chamber 5 inside the cylinder. These chambers will hereafter be referred to as the high-pressure and low-pressure chambers, respectively.

The fluid is used to decelerate the relative motion of the piston and cylinder. The rate deceleration depends on the geometry of a fluid passage between the high- and low-pressure chambers. The seal between the cylinder cap and the piston rod at the exit hole is provided by a seal 6.

In the case of a sleeve liner (FIG. 1), the passage consists of a variable-section cutout 3 in the sleeve liner.

In the counteracting rod brake design (FIG. 2), the means of communication consists of a combination of constant-geometry orifices 8 and 9 and of a variable-diameter counteracting rod 10. This counteracting rod, to the extent that it blocks more or less the orifice, varies the section of the oil passage between the two chambers and therefore the rate of deceleration.

The piston and cylinder may, according to the configuration, be integral with the craddle or slide, or integral with the recoiling mass of the gun. The sectional area of the oil passage between the two chambers, and therefore the rate of deceleration, can be calibrated as a function of the recoil distance travelled. Generally at the start of the recoil, during the time the projectile is travelling through the tube, a nearly zero braking force is desired, in order not to apply forces to the mobile mass that might harm the accuracy of the shot. This is called the "free recoil" phase.

As the sectional area of the oil passage varies, a deceleration is gradually obtained, which will be accompanied by a rise in the pressure in chamber 4 which will increase as the allowable recoil distance decreases.

A common problem of these types of brakes resides in the difficulty of finding the right seals 6. These seals must withstand very severe pressure stresses of the order of 400 bar while the rod may be moving at speeds of up to 20 m/s, under temperature condition ranging from −30° C., to −55° CC.

Few commercially available seals can meet such specifications, which limits the choice of them and increases costs.

Furthermore, knowing that the braking force can be expresed by the formula F=P.S, in which P is the maximum pressure in the chamber 4 and S the active sectional area of piston 1, it can be seen that if any increase has to be made in the recoil force to be absorbed, the only way to do this is to increase the diameter of the brake, since the maximum allowable pressure is limited. Yet it would be advantageous to be able to decrease this diameter without increasing the pressure on the seal at the same time, as this would reduce the weight and dimensions of the brake.

Similarly, for a given diameter, the reduction of this pressure would make it possible to use seals of common quality, costing little and easy to procure and replace.

It is the purpose of the present invention to propose a sealing device that will remedy the disadvantages mentioned above.

SUMMARY OF THE INVENTION

The object of the invention is therefore a sealing device between a piston rod, connected to the recoiling mass or to the gun barrel, and a cylinder, connected to the gun barrel or to the recoiling mass, of an artillery recoil brake. The piston slides in the cylinder, which contains a fluid, and separates a high-pressure chamber from a low-pressure chamber in the cylinder. The respective volumes of the chambers vary according to the position of the piston relative to the cylinder. The device includes a medium-pressure chamber through which the piston rod passes, and which communicates with the high-pressure chamber through a roughly annular channel surrounding the piston rod. This medium-pressure chamber is connected directly to the low-pressure chamber by a pipe having a section greater than that of the annular chamber, to direct the flow entering the medium-pressure chamber through to the low-pressure chamber.

The pipe sectional area is preferably from five to twenty times the sectional area of the annular channel. According to one preferred embodiment, the high- and medium-pressure chambers are separated by a partition with a hole to allow the piston rod to pass through it. The channel then consists of the clearance between this hole and the piston rod, and the area of the annular section of the channel is included between 0.05% and 0.4% of the active section of the high-pressure chamber.

According to variants of the embodiment, the bore includes at least one annular groove, and a friction ring can be installed in one of the grooves of the bore.

In the case of a recoil brake using a sealing device according to the invention and including a filler, the filler will be connected to the medium-pressure chamber and may also be connected to the low-pressure chamber.

BRIEF DESCRIPTION OF THE DRAWINGS

A better understanding of the present invention may be had from a consideration of the following detailed description, taken in conjuntion with the accompanying drawing in which.

In the descriptions that follow, we will voluntarily limit ourselves to the example of a brake with liner, although all of the concepts that are to be spoken of can be applied perfectly to other types of brakes, and in particular those with counteracting rod.

Figure 1:
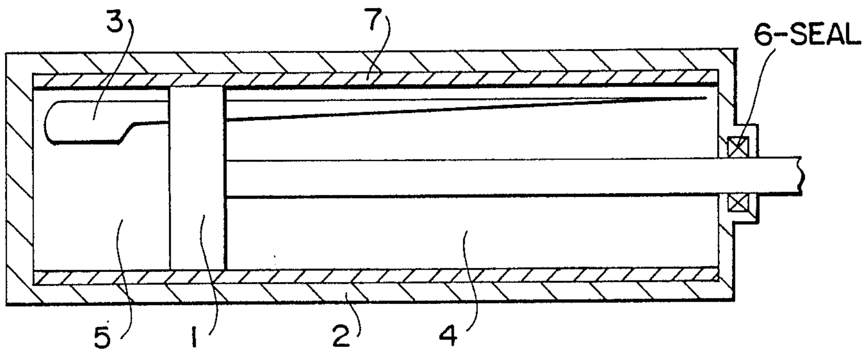
FIGS. 1 and 2 are simplified axial sections of a brake with sleeve liner and a brake with counteracting rod according to the state of the art.
Figure 2:
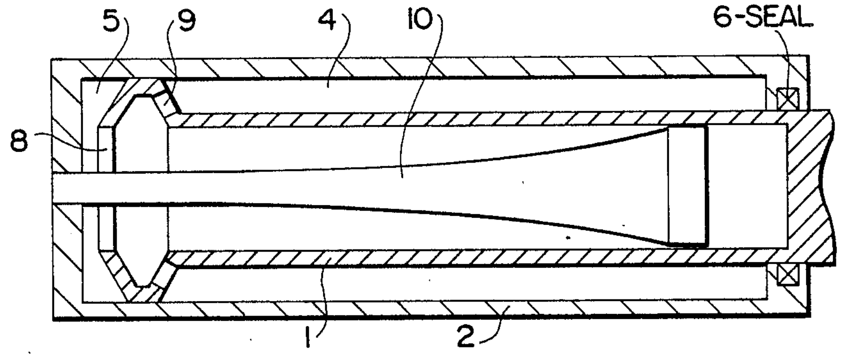
Figure 3:
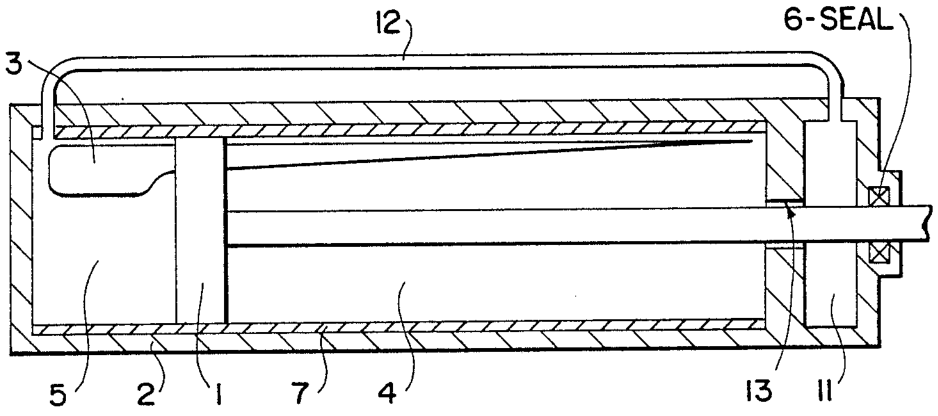
FIG. 3 is a simplified representation of a brake with sleeve using the sealing device according to the invention.

The device shown in FIG. 3 is a sleeve liner type recoil brake similar to the one shown in FIG. 1, already described above. It includes a sealing device consisting of a chamber 11, called medium-pressure chamber, which is contiguous to the high-pressure chamber 4 and which is connected to the low-pressure chamber 5 by pipe 12.

The high-and medium-pressure chambers are separated by a partition drilled with a bore 13 to allow the rod of the piston 1 to pass through. The annular clearance between the piston rod and the bore constitutes a channel of communication between these two chambers.

The annular section of this channel is preferably included between 0.05% and 0.4% of the active section (annular area on which the piston acts) of the high-pressure chamber, so as to lower the pressure sufficiently between the two chambers 4 and 11 while conserving enough pressure in the chamber 4 to provide correct braking.

To limit the pressure in the medium-pressure chamber 11, the cross-section of the pipe 12 will be greater than that of the channel 13 and preferably will be 5 to 20 times greater than this value.

The device operates as follows:

At rest, as was already mentioned in the preamble, there is a pressure of a few bars in all three chambers. This pressure is held at this level by a conventional filler, not shown, which is connected in known fashion to the low-pressure chamber.

At the moment of the firing, the rapid translation of the piston 1 in the cylinder 2 causes the pressure in the chamber 4 to increase (the flow created by the piston motion must pass through the cutout 3 in the linar sleeve 7), the pressure in the chamber 5 becomes practically zero at the same time because of the increase in the volume of this chamber caused by the displacement of the piston 1.

There is then a flow of oil created from the high-pressure chamber 4 toward the medium-pressure chamber 11. The flow rate can be calibrated by the size of the clearance between the bore 13 and the piston rod. At the same time, there is a flow of oil from the medium-pressure chamber 11 toward the low-pressure chamber 5 through the pipe 12.

As the sectional area of the pipe 12 is greater than that of the annular channel, the effect of the latter flow is to limit the pressure in the medium-pressure chamber 11, and hence the pressure exerted on the seal 6.

The load loss between the high-and medium-pressure chambers can be adjusted by changing the sectional area of the annular channel connecting these two chambers, thereby reducing the maxium pressure existing in the medium-pressure chamber to an allowable value for the seal 6.

A brake using such a sealing device has been tested, and the main characteristics are the following:

| | |
|---|---|
| active section of piston 1 | 7368 $mm^2$ |
| maximum volume of chamber 4 | 3.6 l |
| sectional area of the annular channel 13 | 14 $mm^2$ |
| volume of the chamber 11 | 0.005 l |
| section of pipe 12 | 177 $mm^2$ |

Figure 6:
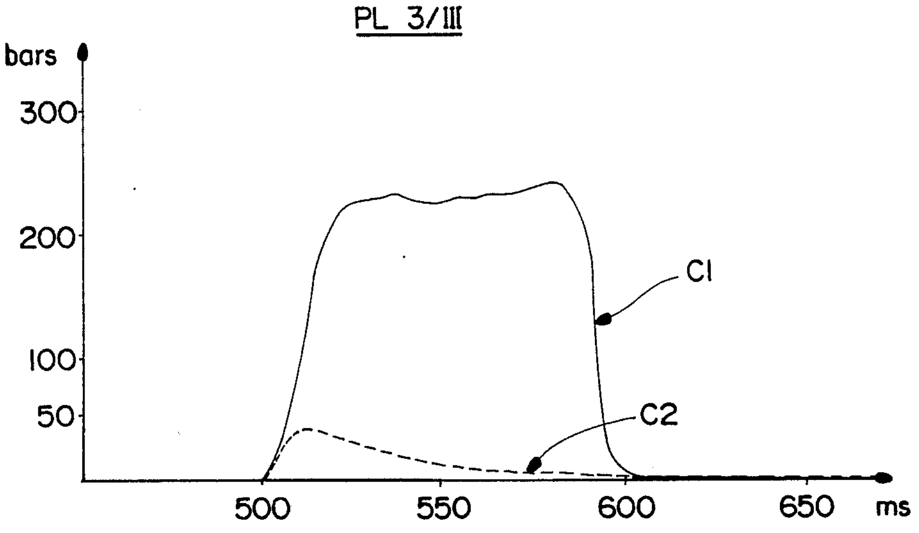
FIG. 6 shows the pressure variations in the high- and medium-pressure chambers as a function of time.

The curves C1 and C2 in FIG. 6 show the pressures in the chambers 4 and 11, respectively, as a function of time. The time origin 0 corresponds to the firing of the propulsive charge of the projectile. We observe that the medium pressure in the chamber 4 is established at a value close to 200 bar while in the chamber 11 we observe a peak at 40 bar followed by a rapid decay to less than 10 bar.

Other variants are possible, in order to increase further the load loss between the chambers 4 and 11.

Second Embodiment

Figure 4:
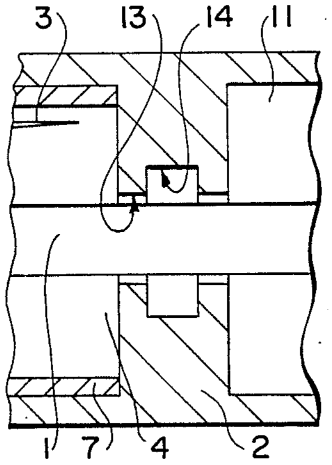
FIGS. 4 and 5 represent two embodiments of the sealing device according to the invention.

Thus in FIG. 4 we have arranged an annular groove 14 in the bore 13. This groove constitutes an additional chamber, causing a first load loss. By varying the number and dimensions of these grooves 14, it is possible to modulate the overall load loss.

Third Embodiment

Figure 5:
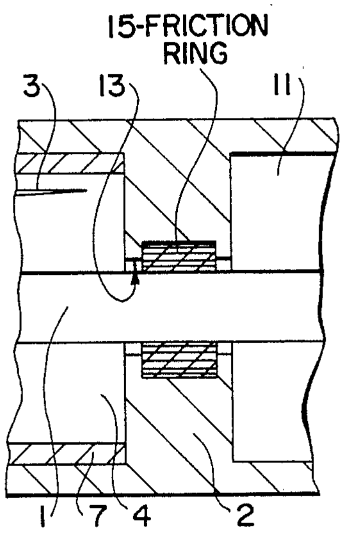

Fig. 5 shows yet another variant in which a friction ring 15 has been arranged in an annular groove of the bore 13. With such an arrangement, the area of the annular section of the channel making the high-and medium-pressure chambers can be adjusted more precisely. It then becomes possible to give a lower value to this section without impairing the mechanical operation of the brake, as the frictional forces can be compensated by choosing an antifriction material for the manufacture of this ring, which can also be replaced in case of excessive wear.

It will naturally be possible to arrange both the annular grooves and a friction ring 15 in the bore 13.

Usually, a filler 16 is connected to the brake at the level of the low-pressure chamber 5. This arrangement allows a minimum filling pressure and protects the filler from high pressures.

The use of the sealing device according to the invention allows other types of connection.

Figure 7:
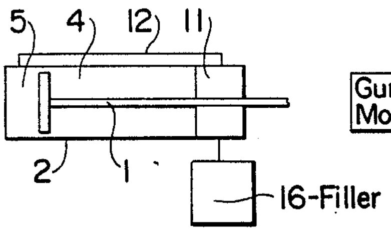
FIGS. 7 to 9 are diagrams of various possible brake organizations using the sealing device according to the invention.

It is possible, for instance, to connect the filler 16 to the medium-pressure chamber 11 (FIG. 7).

Figure 8:
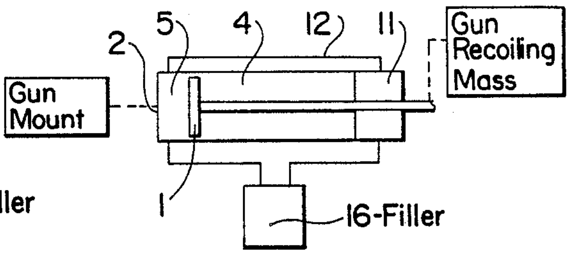
Figure 9:
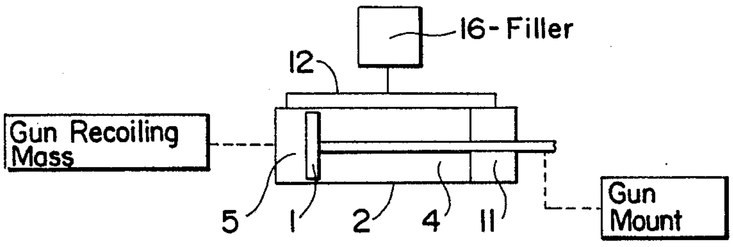

It is also possible to connect the filler 16 both to the low-pressure chamber 5 and to the medium-pressure chamber 11, by separate pipes (FIG. 8) or through the pipe 12 (FIG. 9).

These two modes of connection facilitate the integration of the invention into various types of weapon systems.

What is claimed is:

1. A sealing device between a piston rod and a cylinder of an artillery recoil brake, wherein the recoil brake comprises a cylinder containing a fluid, a piston slidably mounted in said cylinder, a piston rod connected to said piston, a low-pressure chamber and high-pressure chamber, said chambers being defined by portions of said cylinder and having variable volumes determined by the position of said piston within said cylinder, said sealing device comprising:

a medium-pressure chamber defined by said cylinder and separated from said high-pressure chamber by a partition, said partition having a bore formed therethrough which allows said piston rod to pass through said partition;

a substantially annular channel formed between and defined by said bore and said piston rod;

a pipe which provides communication between said medium-pressure chamber and said low-pressure chamber, said pipe having a greater cross-sectional area than that of said annular channel, wherein fluid gathered in said medium-pressure chamber flows toward said low-pressure chamber through said pipe; and a seal fixed in an end wall of said cylinder which defines an end wall of said medium-pressure chamber, said seal being in fluid-contact with said piston rod which protrudes from said cylinder through said end wall.

2. The sealing device of claim 1, wherein the cross-sectional area of said pipe is 5–20 times greater than the cross sectional area of said annular channel.

3. The sealing device of claim 1, wherein the cross-sectional area of said annular channel is 0.05%–0.4% of a cross-sectional area of the inner diameter of said cylinder which defines the area upon which the piston acts.

4. The device of claim 1, wherein said bore comprises at least one annular groove formed therein.

5. The sealing device of claim 4, wherein a friction ring is arranged in at least one of the grooves formed in said bore.

6. An artillery recoil brake, comprising:

a cylinder containing a fluid, said cylinder having a first end wall and a second end wall;

a piston slidably mounted in said cylinder;

a piston rod connected to said piston and protruding from said cylinder through said second end wall;

a low-pressure chamber and a high-pressure chamber, said chambers being defined by portions of said cylinder and having variable volumes determined by the position of said piston within said cylinder;

a medium-pressure chamber defined by a portion of said cylinder which includes said second end wall;

a partition separating said high-pressure chamber and said medium-pressure chamber, said partition having a bore formed therethrough which allows said piston rod to pass through said partition;

a substantially annular channel formed between and defined by said bore and said piston rod;

a pipe which provides communication between said medium-pressure chamber and said low-pressure chamber, said pipe having a greater cross-sectional area than that of said annular channel, wherein fluid gathered in said medium-pressure flows toward said low-pressure chamber through said pipe;

a seal fixed in said second end wall of said cylinder, said seal being in fluid-type contact with said piston rod which protrudes from said cylinder through said second end wall; and filling means connected to said medium-pressure chamber.

7. The artillery recoil brake of claim 6, wherein said filling means is connected to said medium-pressure chamber and said low-pressure chamber.

8. The artillery recoil brake of claim 6, wherein said piston rod is connected to a recoiling mass of a gun and said cylinder is connected to a mount of the gun.

9. The artillery recoil brake of claim 6, wherein the piston rod is connected to a mount of a gun and said cylinder is connected to a recoiling mass of the gun.

* * * * *

UNITED STATES PATENT AND TRADEMARK OFFICE

CERTIFICATE OF CORRECTION

PATENT NO. : 4,957,033

DATED : September 18, 1990

INVENTOR(S) : Dominique Relange et al.

It is certified that error appears in the above-identified patent and that said Letters Patent is hereby corrected as shown below:

On the title page:

COLUMN 1, the Assignee [73] is missing. It should read
-- ETAT FRANCAIS représenté par le Délégué général pour l'armement--

Signed and Sealed this

Eighth Day of December, 1992

Attest:

DOUGLAS B. COMER

*Attesting Officer* *Acting Commissioner of Patents and Trademarks*